3,030,337
VINYL PINONATE AND POLYMERIC
DERIVATIVES THEREOF
Glen W. Hedrick, Lake City, Fla., assignor to the United States of America as represented by the Secretary of Agriculture
No Drawing. Filed Jan. 6, 1959, Ser. No. 785,295
2 Claims. (Cl. 260—63)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a new polymerizable vinyl ester, vinyl pinonate, and to certain polymeric derivatives thereof. More particularly, the invention relates to vinyl pinonate, homopolymers thereof, and copolymers of vinyl pinonate and unsaturated polymerizable compounds.

Polymers obtained by polymerization of vinyl pinonate alone will be referred to hereinafter as "homopolymers" and polymers obtained by polymerization of vinyl pinonate with another polymeric compound will be referred to as "copolymers."

Pinonic acid, 2,2-dimethyl-3-acetylcyclobutane acetic acid has the formula

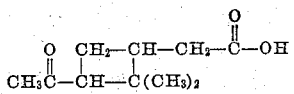

This acid can be produced by permanganate oxidation or ozonolysis of alpha-pinene. Methods for producing this acid have been described by M. Delepine, Bull. soc. chim., France, volume 3 (No. 5) page 1369 (1936), and G. S. Fisher and J. S. Stinson, Ind. Eng. Chem., volume 47, page 1569 (1955).

According to this invention, when pinonic acid is converted to a vinyl ester there is obtained a compound having valuable properties as an intermediate for the production of polymeric materials. The homopolymer of vinyl pinonate has good adhesive properties for glass. Copolymers of vinyl pinonate with vinyl chloride mill at much lower temperatures than polyvinyl chloride homopolymer; and although the copolymers are rigid plastics, the added vinyl pinonate has the property of reducing the rigidity of polyvinyl chloride. Vinyl pinonate has been copolymerized with polyvinyl chloride, vinylidine chloride, acrylonitrile, butadiene, and styrene.

PREPARATION OF VINYL PINONATE

Example 1

552 grams (3 moles) of crude pinonic acid (neutralization equivalent, 184; a mixture of isomers of cis and trans- d,1- and cis and trans-d-pinonic acid, prepared by the oxidation of technical grade alpha-pinene), 16 grams of zinc oxide, and 670 cc. of toluene were placed in a flask and heated to distill the water azeotropically. Heating was continued until the contents were dry and all the zinc oxide had reacted and the solution was clear.

This solution was transferred to an Aminco rocking-type bomb of approximately 2 liter capacity, then warmed to 120° C. and flushed three times with nitrogen. The bomb was left charged with nitrogen under 100 lbs. per sq. in. pressure. Acetylene gas was charged until the pressure was 300 lbs. per sq. in. The bomb was heated to 180° C. and acetylene added as needed as the reaction progressed. The rate of acetylene absorption was about 10 liters per hour. The completion of the reaction was evidenced by lack of further acetylene absorption.

To isolate the vinyl pinonate, the cold reaction mixture was first washed with dilute sulfuric acid and dilute sodium hydroxide then finally with water. The toluene was stripped and the residue distilled, bulb to bulb, B.P. 115°–150° C. at 5 mm. Yield of crude distillate was 470 grams. By fractionation through a 24" Vigreaux column two products resulted, one B.P. 107° C. at 0.5 mm., 74° C. 0.2 mm.; and the other 128° C. at 0.5 mm. The aforementioned crude distillate consisted of about ⅔ by weight of the first product and ⅓ by weight of the latter.

The low-boiling first product, on hydrogenation with palladium on charcoal catalyst, absorbed 1 mole of hydrogen. Saponification equivalent of the hydrogenated sample was 212±1 and the neutral equivalent of the acid obtained after saponification was 184; theory for pinonic acid 184. This is conclusive evidence that the product, B.P. 107° at 0.5 mm., was vinyl pinonate; $n_D^{25}$ 1.4641; $D^{25}$ 1.0063.

The higher boiling product [$n_D^{25}$ 1.48274; $D^{25}$ 1.0056] absorbed 3 moles of hydrogen and had an empirical formula of $C_{14}H_{23}O_3$, saponification equivalent 239. This evidence indicated that the second product although pure was not an isomer of vinyl pinonate.

Example 2

Pure cis-d, 1-pinonic acid, M.P. 103°–105° C., was used in place of the crude pinonic acid of Example 1, and reacted in exactly the same manner as described in Example 1. Two products, having the same boiling point and physical properties as those of Example 1, were obtained from this pure acid.

Example 3

For preparation of vinyl pinonate with vinyl acetate, 552 grams (3 moles) of cis-d, 1-pinonic acid, M.P. 103°–105° C. was added to a 5 liter, 3-neck flask equipped with an agitator and thermometer. 3500 ml. of vinyl acetate was then added. Only a very little of the pinonic acid dissolved. To this mixture, 1 g. copper resinate with 12 g. mercuric acetate was added and agitated 3 hours, after which one and one-half ml. of concentrated sulfuric acid was added. Agitation was continued 24 hours. By this time all the pinonic acid had gone into solution. After 72 hours at room temperature, 10 g. of sodium acetate trihydrate was added and agitated until dissolved.

The vinyl acetate and acetic acid formed were stripped by aspirator vacuum and the residue was distilled, bulb to bulb, B.P. 53° to 98° C. at 1 mm. The crude distillate was fractionated using an 18" Vigreaux column to obtain the product, B.P. 118° C. at 5 mm. 500 grams of vinyl pinonate, refractive index $n_D^{25}$ 1.4632, was thus obtained. By catalytic reduction, 1 mole of hydrogen was absorbed by the vinyl pinonate. Saponification of the vinyl pinonate gave pure cis-d, 1-pinonic acid.

POLYMERIZATIONS

Example 4

Vinyl pinonate was heated with 3% by weight of benzoyl peroxide on a steam bath. Almost immediately a vigorous reaction occurred, yielding a solid homopolymer only partially soluble in benzene.

Example 5

To a 4 oz. screw cap bottle was added 35 grams of aqueous soap solution (2.8% by weight), 10 grams vinyl pinonate, 1.5 ml. of freshly prepared 5% by weight aqueous potassium persulfate solution and 1 small drop of Hooker's lauryl mercaptan in that order. The mixture was swirled slightly to effect even dispersion and the sample bottle was then flushed with nitrogen for 1 minute. The bottle was sealed with a rubber gasket and metal screw cap and placed in a constant temperature water bath at 50° C. where the sample was allowed to be tumbled end-over-end for 46 hours. The resulting polymer was coagulated by slowly adding the emulsion to about 100 ml. of sodium chloride-sulfuric acid-water coagulant. The coagulated polymer was then washed well three times with distilled water and then dissolved in about 250 ml. of dry benzene. The polymer was precipitated by pouring the benzene solution slowly into about 700 ml. of stirred cyclohexane. Re-precipitation was effected three times in this manner. The dry polymer gave carbon and hydrogen analyses very close to theoretical for a homopolymer. In a series of five runs the conversion ranged from 50 to 75%. The homopolymers, in dry benzene solution, had an intrinsic viscosity ranging from 0.3 to 0.5 and melting points around 100° C. The homopolymer in each case was white, tough and slightly elastic, and exhibited film-forming characteristics.

A film of homopolymer applied either from the melt or from solvent adhered tenaciously to a glass surface and could not be stripped off. The incorporation of small amounts of "DOP" (di-2,ethylhexyl phthalate) with the homopolymer greatly reduced its brittleness and enhanced its adhesive characteristics.

I claim:
1. Vinyl pinonate.
2. The solid homopolymer of vinyl pinonate.

References Cited in the file of this patent

UNITED STATES PATENTS

| | | |
|---|---|---|
| 2,066,075 | Reppe | Dec. 29, 1936 |
| 2,508,341 | Wilson | May 16, 1950 |
| 2,671,060 | Morris et al. | Mar. 2, 1954 |
| 2,679,461 | Hasselstrom | May 25, 1954 |

OTHER REFERENCES

Marvel et al.: J. Poly. Science, vol. 27, pages 39–58, January 1958.